June 7, 1927.
M. H. MOFFETT
MONEY RECEPTACLE
Filed Jan. 12, 1923
1,631,934
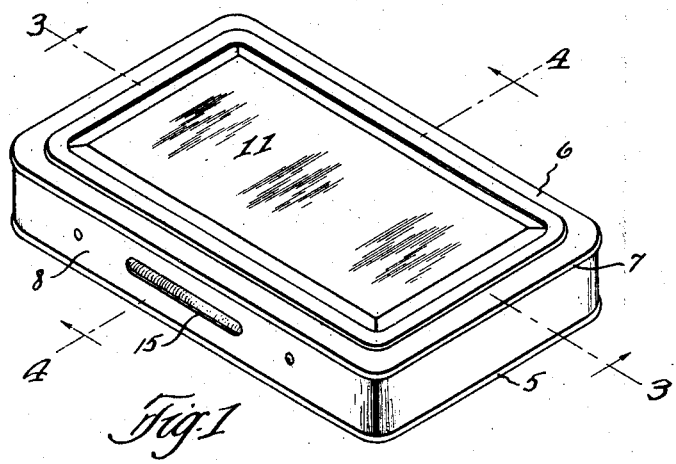
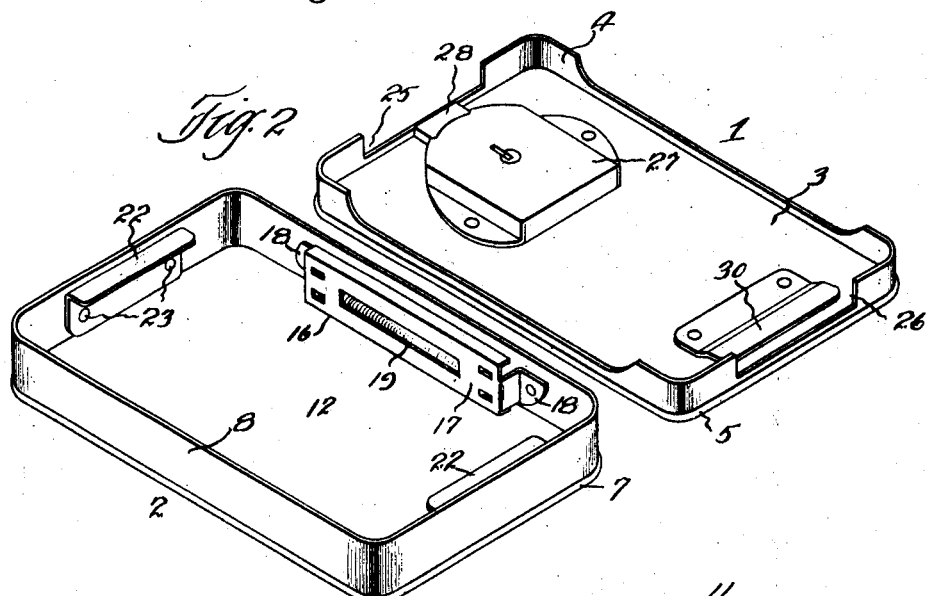
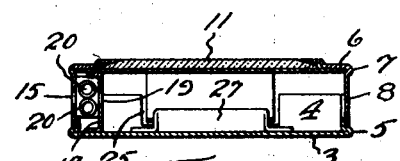
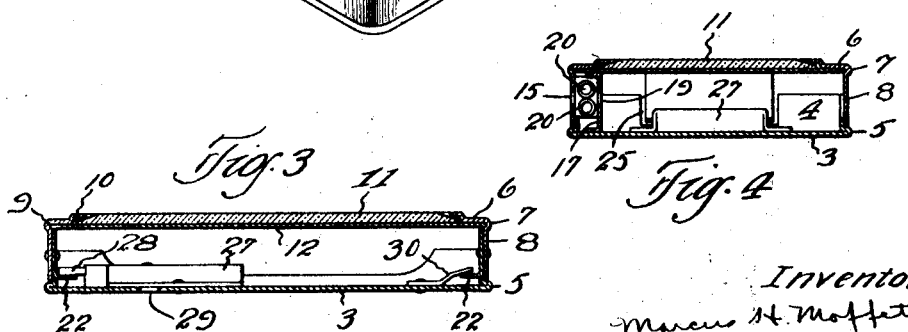
Inventor
Marcus H. Moffett
By Hull, Brock & West
Attys.

Patented June 7, 1927.

1,631,934

UNITED STATES PATENT OFFICE.

MARCUS H. MOFFETT, OF LAKEWOOD, OHIO, ASSIGNOR TO THE BANKERS SAVINGS & CREDIT SYSTEM COMPANY, OF CLEVELAND, OHIO, A CORPORATION OF OHIO.

MONEY RECEPTACLE.

Application filed January 12, 1923. Serial No. 612,219.

This invention relates to a portable money receptacle that is especially suitable for ladies' use in that it may be readily carried in hand bags or vanity cases and is provided with a mirror which makes it a very convenient toilet article as well as a commodious means of accumulating small amounts of money, for subsequent deposit in savings accounts if desired, the utility of the device as a toilet article being an inducement to keep it handy at all times, while its other use with its frequent handling encourages thrift.

The objects are to provide an attractive article of the foregoing nature which is compact, light and strong, is convenient of use, and which may be securely locked yet quickly opened by means of a suitable instrument or key and as readily closed, a quality essential in articles of this character when used as primarily intended for accumulating savings to be deposited in banks.

Further objects of the invention are to provide a comparatively simple and inexpensive construction, formed of few preferably stamped metal parts that are so designed, and which interfit in such manner, as to facilitate manufacture and assembly; which is very rigid; and wherein the mirror is neatly and securely mounted and properly protected.

An embodiment of the invention is illustrated in the accompanying drawing wherein Fig. 1 is a perspective view of the device; Fig. 2 is a similar view, with the cover removed from the base; while Figs. 3 and 4 are sections through the device on the respective lines 3—3 and 4—4 of Fig. 1.

The receptacle is comprised of a base 1 and a cover 2, each of which is preferably formed from a single piece of sheet metal. The base 1 comprises a flat wall 3 that is surrounded by a flange 4, the flange being joined to the wall through a bead 5. By reference to Figs. 3 and 4, it will be seen that the bead 5 is formed by turning the edge portion of the wall 3 back upon itself to where it joins the flange 4. The cover 2 is similarly formed with a marginal wall 6 that is connected through a peripheral bead 7, with a flange 8. It will be noted that bead 7, formed as it is, provides an internal groove 9 for a purpose which I shall presently explain. The inner edge portion of the marginal wall 6 is depressed outwardly a suitable distance to provide a shoulder or seat 10 against which the beveled edge of a mirror 11 bears and in contact with which it is held by a backing plate 12 that is preferably formed of thin resilient metal which may be pressed into place with its edge confined within the groove 9. The resiliency of the parts which hold the mirror relieves it of any undue strains and compensates for any slight variations in the thickness of different mirrors. The plate 12 is quickly and conveniently forced into place and serves to thoroughly protect the back of the mirror against injury from coins contained within the receptacle. Also, the depressed portion of the marginal wall 6 which constitutes the seat for the mirror is preferably deep enough to be at least flush with the surface of the mirror so as to protect the mirror against breakage when the receptacle is laid face down.

A coin slot is formed in one of the side portions of the flange 8, and a suitable protector 16 therefor is secured to the inner side of the flange in operative relation to the coin slot. The protector constitutes no part of my present invention but may be described briefly as comprising a casing member 17 which is connected through ears 18 with the aforesaid flange and has a slot 19 opposite the slot 15. Tension springs 20 are arranged on opposite sides of the plane of the slots 15 and 19 to normally close the passageway. The springs yield to the passage of a coin that is forced into the receptacle, and then close together to prevent its dislodgment therefrom.

Secured to the inner side of each end portion of the flange 8 is a ledge 22, said ledge, according to the present construction, being formed by one branch of an angle member, the other branch whereof is connected as by rivets 23, to the flange of the cover. The end portions of the flange 4 of the base 1 are provided with notches 25 and 26 for the accommodation of the ledges 22, and secured to the flat wall 3 of the base adjacent the notch 25 is a lock 27 which has its bolt 28 directed toward said notch. A keyhole 29 is formed in the wall 3 in register with the keyhole of the lock. A cleat 30 is secured to the wall 3 adjacent the notch 26.

When the cover is applied to the base, its flange 8 telescopes over the flange 4 and bears with its edge upon the bead 5, while the ledges 22 occupy the notches 25 and 26 with the cleat 30 engaged over one of the ledges and the bolt 28 of the lock engaged over the other, thereby to secure the cover to the base. The cover is reversible with respect to the base, and each of the side portions of the flange 4 is cut away to a depth sufficient to accommodate the coin slot protector 16. In applying the cover, the cleat 30 is first engaged over one of the ledges 22 after which the end of the base carrying the lock 27 is forced into the cover and the bolt of the lock projected over the other ledge.

Having thus described my invention, what I claim is:

1. A coin receptacle of the character described comprising a base having a peripheral flange, a cover having a similar flange arranged to telescope over the flange of the base, ledges extending inwardly from opposed parts of the flange of the cover, the flange of the base having notches through which said ledges extend, a part on the base for engagement over one ledge, and a lock carried by the base the bolt whereof is adapted to be projected over the other ledge, the interlocking parts being so constructed as to permit reversal of the casing members with respect to each other.

2. A coin receptacle of the character described comprising casing members having peripheral flanges arranged to telescope one within the other, the casing members having at diametrically opposed points interlocking parts for securing the casing members together, the interlocking parts being of such nature as to permit reversal of the casing members with respect to each other, the outer of the telescoping flanges having a coin slot, and a protector for said coin slot disposed on the inner side of said flange adjacent the coin slot, the inner flange being cut away at diametrically opposed points to accommodate the protector when the casing members are placed together in either of their reversed positions.

3. A coin receptacle of the character described comprising a rectangular base having a peripheral flange and a correspondingly shaped cover having a similar flange arranged to teselcope over the flange of the base, ledges extending inwardly from opposed parts of the flange of the cover, the corresponding parts of the flange of the base having notches through which the ledges extend, a part on the base for engagement over one ledge, a lock carried by the base the bolt whereof is adapted to be projected over the other ledge, the parts being of such nature as to permit reversal of the cover with respect to the base, the portions of the flange of the base which are at right angles to the notched parts thereof being cut away, one of the corresponding portions of the flange of the cover having a coin slot, and a protector disposed on the inner side of the flange adjacent said coin slot.

4. A coin receptacle of the character described comprising a base having a peripheral flange and a shoulder adjacent the base of said flange, a cover having a similar flange arranged to telescope over the flange of the base and engage said shoulder, ledges extending inwardly from opposed parts of the flange of the cover and over the flange of the base, a part on the base for engagement over one ledge, a lock carried by the base the bolt whereof is adapted to be projected over the other ledge, the flange of the cover having a coin slot, and a protector for said coin slot disposed on the inner side of said flange and extending over the flange of the base.

In testimony whereof, I hereunto affix my signature.

MARCUS H. MOFFETT.